US008892801B2

(12) United States Patent
Tune

(10) Patent No.: US 8,892,801 B2
(45) Date of Patent: Nov. 18, 2014

(54) ARBITRATION CIRCUITY AND METHOD FOR ARBITRATING BETWEEN A PLURALITY OF REQUESTS FOR ACCESS TO A SHARED RESOURCE

(75) Inventor: Andrew David Tune, Dronfield (GB)

(73) Assignee: ARM Limited, Cambridge (GB)

( * ) Notice: Subject to any disclaimer, the term of this patent is extended or adjusted under 35 U.S.C. 154(b) by 365 days.

(21) Appl. No.: 13/478,432

(22) Filed: May 23, 2012

(65) Prior Publication Data

US 2013/0318270 A1 Nov. 28, 2013

(51) Int. Cl.
*G06F 12/00* (2006.01)
*G06F 13/14* (2006.01)
*G06F 13/38* (2006.01)

(52) U.S. Cl.
USPC .......................................... 710/244; 710/242

(58) Field of Classification Search
CPC ....................................................... G06F 13/14
USPC ................................................. 710/240–244
See application file for complete search history.

(56) References Cited

U.S. PATENT DOCUMENTS

| | | | | |
|---|---|---|---|---|
| 4,663,756 A | * | 5/1987 | Retterath | 370/462 |
| 4,672,536 A | * | 6/1987 | Giroir et al. | 710/241 |
| 4,742,348 A | * | 5/1988 | Wagner | 340/2.28 |
| 5,263,163 A | * | 11/1993 | Holt et al. | 710/242 |
| 5,546,544 A | * | 8/1996 | Dike et al. | 710/107 |
| 7,003,609 B2 | * | 2/2006 | Ripy et al. | 710/113 |
| 7,051,133 B2 | * | 5/2006 | Takata | 710/111 |
| 2005/0138252 A1 | * | 6/2005 | Gwilt | 710/110 |
| 2014/0115217 A1 | * | 4/2014 | Auerbach et al. | 710/240 |

FOREIGN PATENT DOCUMENTS

| | | | | |
|---|---|---|---|---|
| EP | 2712123 A1 | * | 3/2014 | H04L 12/40 |
| GB | 2309139 B | * | 12/1997 | G06F 9/48 |
| JP | 04279956 A | * | 10/1992 | G06F 13/362 |
| WO | WO 9809224 A2 | * | 3/1998 | G06F 13/374 |

OTHER PUBLICATIONS

"NN9105293: Processor/Memory Switch Which Maintains the Temporal Ordering of Requests", May 1, 1991, IBM, IBM Technical Disclosure Bulletin, vol. 33, Iss.12, pp. 293-296.*
Hasnaoui et al., "An implementation of a proposed modification of CAN protocol on CAN fieldbus controller component for supporting a dynamic priority policy," Industry Applications Conference, 2003. 38th IAS Annual Meeting. Conference Record of the , vol. 1, pp. 23-31, Oct. 12-16, 2003.*

(Continued)

*Primary Examiner* — Faisal M Zaman
(74) *Attorney, Agent, or Firm* — Nixon & Vanderhye P.C

(57) ABSTRACT

Arbitration circuitry for arbitrating between a plurality W of requests R for access to a shared resource. Included are state bits storage storing I state bits Q and generating 2I output bits comprising the true and compliment values of each stored state bit and routing circuitry for generating a set of mask signals M from the output bits. Grant circuitry receives the set of mask signals and the plurality of requests, and grants access to the shared resource to an asserted request having regard to the priority ordering encoded by the set of mask signals. State bit update circuitry is responsive to a trigger condition to perform an update causing a change in the priority ordering encoded by the set of mask signals. The routing circuitry provides a pattern of connections such that each mask signal in the set is directly connected to one of said output bits.

18 Claims, 15 Drawing Sheets

(56) References Cited

OTHER PUBLICATIONS

Toda et al., "A priority forwarding router chip for real-time interconnection networks," Real-Time Systems Symposium, 1994., Proceedings. , pp. 63-73, Dec. 7-9, 1994.*

Ugurdag et al., "Generating fast logic circuits for m-select n-port Round Robin Arbitration," Very Large Scale Integration (VLSI-SoC), 2013 IFIP/IEEE 21st International Conference on , pp. 260-265, Oct. 7-9, 2013.*

Jou et al., "An Optimal Round-Robin Arbiter Design for NoC", *Journal of Information Science and Engineering*, vol. 26, 2010, pp. 2047-2058.

Ugurdag et al., "An In-Depth Look at Prior Art in Fast Round-Robin Arbiter Circuits", *Ozyegin University*, 2011, 15 pgs.

Weber, "Arbiters: Design Ideas and Coding Styles", *SNUG Boston*, 2001, pp. 1-22.

\* cited by examiner

REQUEST GRANT CIRCUITRY FOR REQUEST X

|  | REQUEST GROUPING 0 MEMBERSHIP | REQUEST GROUPING 1 MEMBERSHIP |
| --- | --- | --- |
| GROUP 0 | $R_0$ <br><br> $R_1$ | $R_0$ <br><br> $R_2$ |
| GROUP 1 | $R_2$ <br><br> $R_3$ | $R_1$ <br><br> $R_3$ |
|  | ALL RELATIVE PRIORITES CONTROLLED BY STATE BIT $Q_0$ | ALL RELATIVE PRIORITES CONTROLLED BY STATE BIT $Q_1$ |
| GROUP 0 MEMBER GETS PRIORITY OVER GROUP 1 MEMBER IF ASSOCIATED STATUS BIT NOT SET | $R_0 \rightarrow R_2$ <br> $R_1 \rightarrow R_2$ <br> $R_1 \rightarrow R_3$ | $R_0 \rightarrow R_1$ <br> $R_2 \rightarrow R_3$ <br> $R_0 \rightarrow R_3$ |

FIG. 7C

| $Q_0$ | $Q_1$ | $Q_2$ | PRIORITY ORDERING |
|---|---|---|---|
| 0 | 0 | 0 | $R_0$ $R_1$ $R_2$ $R_3$ $R_4$ $R_5$ $R_6$ $R_7$ |
| 0 | 0 | 1 | $R_1$ $R_0$ $R_3$ $R_2$ $R_5$ $R_4$ $R_7$ $R_6$ |
| 0 | 1 | 0 | $R_2$ $R_3$ $R_0$ $R_1$ $R_6$ $R_7$ $R_4$ $R_5$ |
| 0 | 1 | 1 | $R_3$ $R_2$ $R_1$ $R_0$ $R_7$ $R_6$ $R_5$ $R_4$ |
| 1 | 0 | 0 | $R_4$ $R_5$ $R_6$ $R_7$ $R_0$ $R_1$ $R_2$ $R_3$ |
| 1 | 0 | 1 | $R_5$ $R_4$ $R_7$ $R_6$ $R_1$ $R_0$ $R_3$ $R_2$ |
| 1 | 1 | 0 | $R_6$ $R_7$ $R_4$ $R_5$ $R_2$ $R_3$ $R_0$ $R_1$ |
| 1 | 1 | 1 | $R_7$ $R_6$ $R_5$ $R_4$ $R_3$ $R_2$ $R_1$ $R_0$ |

|  | REQUEST GROUPING 0 MEMBERSHIP | REQUEST GROUPING 1 MEMBERSHIP | REQUEST GROUPING 2 MEMBERSHIP |
|---|---|---|---|
| GROUP 0 | $R_0$<br>$R_1$<br>$R_2$<br>$R_3$ | $R_0$<br>$R_1$<br>$R_4$<br>$R_5$ | $R_0$<br>$R_2$<br>$R_4$<br>$R_6$ |
| GROUP 1 | $R_4$<br>$R_5$<br>$R_6$<br>$R_7$ | $R_2$<br>$R_3$<br>$R_6$<br>$R_7$ | $R_1$<br>$R_3$<br>$R_5$<br>$R_7$ |
|  | ALL RELATIVE PRIORITES CONTROLLED BY STATE BIT $Q_0$ | ALL RELATIVE PRIORITES CONTROLLED BY STATE BIT $Q_1$ | ALL RELATIVE PRIORITES CONTROLLED BY STATE BIT $Q_2$ |

GROUP 0 MEMBER GETS PRIORITY OVER GROUP 1 MEMBER IF ASSOCIATED STATUS BIT NOT SET

{

| | | |
|---|---|---|
| $R_0 \to R_4$<br>$R_0 \to R_5$<br>$R_0 \to R_6$<br>$R_0 \to R_7$<br>$R_1 \to R_4$<br>$R_1 \to R_5$<br>$R_1 \to R_6$<br>$R_1 \to R_7$<br>$R_2 \to R_4$<br>$R_2 \to R_5$<br>$R_2 \to R_6$<br>$R_2 \to R_7$<br>$R_3 \to R_4$<br>$R_3 \to R_5$<br>$R_3 \to R_6$<br>$R_3 \to R_7$ | $R_0 \to R_2$<br>$R_0 \to R_3$<br>$R_1 \to R_2$<br>$R_1 \to R_3$<br>$R_4 \to R_6$<br>$R_4 \to R_7$<br>$R_5 \to R_6$<br>$R_5 \to R_7$ | $R_0 \to R_1$<br>$R_2 \to R_3$<br>$R_4 \to R_5$<br>$R_6 \to R_7$ |

FIG. 12

ARBITRATION CIRCUITY AND METHOD FOR ARBITRATING BETWEEN A PLURALITY OF REQUESTS FOR ACCESS TO A SHARED RESOURCE

BACKGROUND OF THE INVENTION

1. Field of the Invention

The present invention relates to an arbitration circuit and method for arbitrating between a plurality of requests for access to a shared resource. The shared resource can take a variety of forms, for example a bus, a switching fabric, a buffer, a processing element, a shared memory, etc.

2. Description of the Prior Art

The function of an arbiter is to select between multiple asserted requests seeking access to the shared resource. Often there is a need for a "fair" arbiter, which is arranged to apply an arbitration policy so that over time no one request is favoured over any other request. Accordingly, a fair arbiter will ensure that no one request is starved of service by constantly having a lower priority than other requests. In many cases, weak fairness (which ensures freedom from starvation of service), as compared with strong fairness (where for a particular request the arbiter must grant each other request at most once whilst that particular request remains asserted) is sufficient.

The paper "Arbiters: Design Ideas and Coding Styles" by Matt Weber, Synopsys Users Group (SNUG), Boston, Mass., USA, 2001, describes several well-known arbiter designs. The book "Principles and Practices of Interconnection Networks", by William Dally and Brian Towles, 2004, describes in Chapter 18 (entitled "Arbitration") both a round-robin arbiter and a matrix arbiter, and contains a general description of fairness in arbitration. The book "Logical Effort: Designing Fast CMOS Circuits" by Sutherland et al, 1999, discusses circuits for a simple priority arbiter and also discusses how wide logic functions can be implemented as optimal trees of gates, giving an example of the decoder implemented in a tree form.

A common design of arbiter is a round-robin arbiter. A round-robin arbiter can give strong fairness when state update circuitry is provided to ensure that the next state of the arbiter has regard to the currently granted request. If only weak fairness is required, a round robin arbiter can again be used, but without the state update circuitry, and indeed the typical solution used to provide a fast starvation-free arbiter (i.e. an arbiter providing weak fairness) uses a round-robin design. The paper "An In-Depth Look at Prior Art in Fast Round-Robin Arbiter Circuits" by Fatih Uğurdağ and Onur Baskirt, Özyeğin University Technical Report: OZU-EF-2011-0001, August 2011, provides a survey of fast round-robin arbiter implementations. The paper "An Optimal Round-Robin Arbiter Design for NoC" by Jou and Lee, Journal of Information Science and Engineering 26, pages 2047 to 2058, 2010, provides another example of a round-robin arbiter.

Other solutions proposed for fast starvation-free arbiters include matrix-based arbiters with a least-recently-granted (LRG) policy or tree arbiters with a pseudo-LRG policy.

Arbiters are often found on the critical path within data processing systems, and accordingly it would be desirable to provide an improved arbiter design for providing fast starvation-free arbitration, which is both smaller and faster than known implementations.

SUMMARY OF THE INVENTION

Viewed from a first aspect, the present invention provides arbitration circuitry for arbitrating between a plurality W of requests R for access to a shared resource, comprising: state bits storage configured to store I state bits Q and to generate 2I output bits comprising the true and compliment values of each stored state bit; routing circuitry configured to generate a set of mask signals M from the output bits, the set of mask signals encoding a priority ordering amongst the plurality of requests, with the mask signal $M_{xy}$ encoding whether the request $R_y$ has greater priority than the request $R_x$; grant circuitry configured to receive the set of mask signals and the plurality of requests, and to grant access to the shared resource to an asserted request from said plurality of requests that, having regard to the priority ordering encoded by the set of mask signals, has a higher priority than any other asserted request amongst said plurality of requests; state bit update circuitry configured in response to a trigger condition to perform an update operation to alter the value of at least one of the stored state bits thereby causing a change in the priority ordering encoded by the set of mask signals; the routing circuitry providing a pattern of connections such that each mask signal in the set is directly connected to one of said output bits; the pattern of connections being determined by a process at least equivalent to: (i) for each of the I state bits, forming an associated request grouping where the plurality of requests are split into a first group and a second group, such that for every combination of request x and request y, where x is not equal to y, there is at least one request grouping where request x and request y are not in the same group; and (ii) when determining the connections for the mask signals $M_{xy}$ and $M_{yx}$, selecting one of the at least one request grouping where request x and request y are not in the same group, identifying the two output bits comprising the true and compliment values of the state bit associated with that selected request grouping, connecting the mask signal $M_{xy}$ to that one of those two output bits comprising the true value of the state bit if request x is in said first group, connecting the mask signal $M_{xy}$ to that one of those two output bits comprising the compliment value of the state bit if request x is in said second group, and connecting the mask signal $M_{yx}$ to the other of those two output bits not connected to the mask signal $M_{xy}$.

The inventor of the present invention realised that the use of round robin arbiters without associated state update circuitry, in order to implement arbitration with weak fairness, provides a sub-optimal solution. Furthermore, the inventor of the present invention realised that by not restricting the arbitration circuitry design to use round-robin, least-recently-granted or other similar known arbitration schemes typically employed for starvation-free arbiters, it was possible to produce a design of arbitration circuitry that had freedom to implement a minimum-delay path between the asserted request and associated grant signal, with a low fan-out and a small number of state bits.

In particular, in accordance with the present invention, the routing circuitry provides a pattern of connections such that each mask signal in the set of mask signals that encode the priority ordering amongst the plurality of requests is directly connected to either the true or compliment value of one of the stored state bits. Furthermore, the pattern of connections is determined by the following logical sequence of steps, or a process equivalent to that logical sequence. Firstly, for each of the I state bits, an associated request grouping is formed where the plurality of requests are split into a first group and a second group, such that for every combination of request x and request y, where x is not equal to y, there is at least one request grouping where request x and request y are not in the same group. Then, when determining the connections for the mask signals $M_{xy}$ and $M_{yx}$, one request grouping where request x and request y are not in the same group is selected, and the two output bits comprising the true and compliment values of the state bit associated with that selected request grouping are identified. The mask signal $M_{xy}$ is then connected to that one of those two output bits comprising the true value of the state bit if request x is in the first group, or is connected to that one of those two output bits comprising the compliment value of the state bit if request x is in the second group. The mask signal $M_{yx}$ is then connected to the other of those two output bits not connected to the mask signal $M_{xy}$.

Such an approach leads to a significant reduction in complexity of the routing circuitry, and requires only a small number of state bits. Further, by cycling through unique values of the stored state bits, the resultant changes in the priority ordering encoded by the set of mask signals can be arranged to implement starvation free arbitration, since each request will have the highest priority at least once during such a cycle of changes to the value of the state bits.

Thus, the arbitration circuitry the present invention provides a starvation-free arbiter which is smaller and faster than known prior art starvation-free arbitration circuits. In one embodiment, the number of state bits I is equal to a result of the computation $\log_2 W$ if that result is an integer. Hence, purely by way of example, if there are eight requests to be arbitrated amongst, only three state bits are required to implement the arbitration circuitry.

However, the techniques of the present invention are not limited to any particular number of requests. In one embodiment, if the result of the computation $\log_2 W$ is a non-integer, the number of state bits I is set equal to the next integer larger than that result. Hence, purely by way of example, if there are thirteen requests to be arbitrated amongst, four state bits will be used to implement the arbitration circuitry.

In one embodiment, during the performance of a sequence of update operations the state bit update circuitry is configured to employ a cycle of at least W unique combinations of values of said state bits, such that by the time said cycle has been completed, each request will at least once have been the highest priority request according to the associated priority ordering.

In one particular embodiment, each unique combination of values of said state bits appears only once in said cycle. In instances where the number of state bits I is equal to the result of the computation $\log_2 W$, it will be appreciated that this will cause each request to be the highest priority request once during each cycle, hence providing a starvation-free arbiter which applies no biasing (also referred to herein as weighting) between the various requests.

In an alternative embodiment, the state bit update circuitry is arranged such that at least one unique combination of values of said state bits appears more than once in said cycle in order to introduce a weighting in respect of at least one of said plurality of requests.

In situations where the number of state bits I is greater than the result of the computation $\log_2 W$, it will be appreciated that not all unique combinations of values of the state bits need to be employed in order to ensure that each request is the highest priority request once during each cycle. However, in such situations, if it is desired to apply a weighting to at least one of the requests, there is another option available instead of requiring at least one unique combination of values to appear more than once in the cycle. In particular, instead it can be arranged that each unique combination of values of said state bits is employed in said cycle, and this in itself will introduce a weighting in respect of at least one of said plurality of requests.

Whilst in one embodiment the cycle used by the state bit update circuitry to alter the value of the stored state bits may be predetermined and fixed, in an alternative embodiment the cycle used by the state bit update circuitry is programmable, thereby allowing the form of starvation free arbitration applied to be altered if desired.

The number of requests placed into each of the first group and the second group can be varied dependent on implementation, provided that in respect of all of the request groupings formed, there is at least one request grouping where request x and request y are not in the same group. However, in one embodiment, the first group and the second group of each request grouping have an equal number of the requests when W is an even number, and a difference of one request when W is an odd number.

The grant circuitry can take a variety of forms. However, in one embodiment, the grant circuitry comprises a grant generation block associated with each request signal, each grant generation block having a NAND function block configured to perform a logical NAND of each non-associated request with the relevant mask signal for that non-associated request in order to produce a sequence of NAND output signals, and a grant assertion block configured to assert a grant signal for the associated request if the associated request is asserted and none of the NAND output signals are set. Such an approach provides for an efficient implementation, since the logic required produces a path delay in number of gates equal to that of a simple priority arbiter (the minimal implementation of any arbiter in terms of logic gates) plus one two-input NAND gate function.

In an alternative embodiment, the arbitration circuitry can be constructed to have a tree form. In particular, in such an embodiment, the arbitration circuitry comprises multiple instances of a circuit block interconnected to form a tree structure used to collectively implement the routing circuitry and the grant circuitry, the tree structure having multiple stages, each stage employing at least one instance of the circuit block, and each circuit block being used to arbitrate between multiple of said requests. This form of circuit pre-arbitrates between groups of requests at each stage and then arbitrates between these groups at the next stage (if the group has at least one active request). It trades off significantly reduced area and fan-out from the request inputs against a longer logic path from request inputs to grant outputs. As the number of requests requiring arbitration increases, this tree form of circuitry is likely to be more preferable.

The tree structure can be arranged in a variety of ways. For example, in one embodiment, the tree structure is a radix-2 tree structure and each circuit block is used to arbitrate between two of said requests. In an alternative embodiment, the tree structure is a radix-4 tree structure and at least one of said circuit blocks is used to arbitrate between four of said requests.

In one embodiment where such a tree structure is used, for each stage, every circuit block within that stage is connected to the same output bits from the state bits storage. This provides a particularly simple and effective approach.

Whilst the state bits storage and state bit update circuitry may be provided solely as part of the arbitration circuitry, this is not necessary in all embodiments. For example, the state bits storage and state bit update circuitry may be shared with one or more other components of a data processing apparatus within which the arbitration circuitry is incorporated. Such other components may be one or more further instances of the arbitration circuitry, such that multiple arbitration circuits share the same state bits storage and state bit update circuitry. Alternatively, the other components may be unrelated to arbitration, but utilise state bits storage and state bit update circuitry that exhibit the required functionality, i.e. they cycle through at least W unique states in a way that is independent of the sequence of grants from the arbitration circuitry.

Viewed from a second aspect, the present invention provides a method of arbitrating between a plurality W of requests R for access to a shared resource, comprising: storing I state bits Q and generating 2I output bits comprising the true and compliment values of each stored state bit; employing routing circuitry to generate a set of mask signals M from the output bits, the set of mask signals encoding a priority ordering amongst the plurality of requests, with the mask signal $M_{xy}$ encoding whether the request $R_y$ has greater priority than the request $R_x$; based on the set of mask signals and the plurality of requests, granting access to the shared resource to an asserted request from said plurality of requests that, having regard to the priority ordering encoded by the set of mask signals, has a higher priority than any other asserted request amongst said plurality of requests; in response to a trigger condition, performing an update operation to alter the value of at least one of the stored state bits thereby causing a change in the priority ordering encoded by the set of mask signals; and arranging the routing circuitry to provide a pattern of connections such that each mask signal in the set is directly connected to one of said output bits, and determining the pattern of connections by a process at least equivalent to: (i) for each of the I state bits, forming an associated request grouping where the plurality of requests are split into a first group and a second group, such that for every combination of request x and request y, where x is not equal to y, there is at least one request grouping where request x and request y are not in the same group; and (ii) when determining the connections for the mask signals $M_{xy}$ and $M_{yx}$, selecting one of the at least one request grouping where request x and request y are not in the same group, identifying the two output bits comprising the true and compliment values of the state bit associated with that selected request grouping, connecting the mask signal $M_{xy}$ to that one of those two output bits comprising the true value of the state bit if request x is in said first group, connecting the mask signal $M_{xy}$ to that one of those two output bits comprising the compliment value of the state bit if request x is in said second group, and connecting the mask signal $M_{yx}$ to the other of those two output bits not connected to the mask signal $M_{xy}$.

Viewed from a third aspect, the present invention provides a method of generating routing circuitry for arbitration circuitry used to arbitrate between a plurality W of requests R for access to a shared resource, the arbitration circuitry having state bits storage for storing I state bits Q and for generating 2I output bits comprising the true and compliment values of each stored state bit, the routing circuitry for generating a set of mask signals M from the output bits, the set of mask signals encoding a priority ordering amongst the plurality of requests, with the mask signal $M_{xy}$ encoding whether the request $R_y$ has greater priority than the request R., grant circuitry for receiving the set of mask signals and the plurality of requests, and for granting access to the shared resource to an asserted request from said plurality of requests that, having regard to the priority ordering encoded by the set of mask signals, has a higher priority than any other asserted request amongst said plurality of requests, and state bit update circuitry configured in response to a trigger condition to perform an update operation to alter the value of at least one of the stored state bits thereby causing a change in the priority ordering encoded by the set of mask signals, the method comprising: providing within the routing circuitry a pattern of connections such that each mask signal in the set is directly connected to one of said output bits; determining the pattern of connections by a process at least equivalent to: (i) for each of the I state bits, forming an associated request grouping where the plurality of requests are split into a first group and a second group, such that for every combination of request x and request y, where x is not equal to y, there is at least one request grouping where request x and request y are not in the same group; and (ii) when determining the connections for the mask signals $M_{xy}$ and $M_{yx}$, selecting one of the at least one request grouping where request x and request y are not in the same group, identifying the two output bits comprising the true and compliment values of the state bit associated with that selected request grouping, connecting the mask signal $M_{xy}$ to that one of those two output bits comprising the true value of the state bit if request x is in said first group, connecting the mask signal $M_{xy}$ to that one of those two output bits comprising the compliment value of the state bit if request x is in said second group, and connecting the mask signal $M_{yx}$ to the other of those two output bits not connected to the mask signal $M_{xy}$.

Viewed from a fourth aspect, the present invention provides arbitration circuitry for arbitrating between a plurality W of requests R for access to a shared resource, comprising: state bits storage means for storing I state bits Q and for generating 2I output bits comprising the true and compliment values of each stored state bit; routing means for generating a set of mask signals M from the output bits, the set of mask signals encoding a priority ordering amongst the plurality of requests, with the mask signal $M_{xy}$ encoding whether the request $R_y$ has greater priority than the request $R_x$; grant means for receiving the set of mask signals and the plurality of requests, and for granting access to the shared resource to an asserted request from said plurality of requests that, having regard to the priority ordering encoded by the set of mask signals, has a higher priority than any other asserted request amongst said plurality of requests; state bit update means for performing an update operation in response to a trigger condition in order to alter the value of at least one of the stored state bits thereby causing a change in the priority ordering encoded by the set of mask signals; the routing means for providing a pattern of connections such that each mask signal in the set is directly connected to one of said output bits; the pattern of connections being determined by a process at least equivalent to: (i) for each of the I state bits, forming an associated request grouping where the plurality of requests are split into a first group and a second group, such that for every combination of request x and request y, where x is not equal to y, there is at least one request grouping where request x and request y are not in the same group; and (ii) when determining the connections for the mask signals $M_{xy}$ and $M_{yx}$, selecting one of the at least one request grouping where request x and request y are not in the same group, identifying the two output bits comprising the true and compliment values of the state bit associated with that selected request grouping, connecting the mask signal $M_{xy}$ to that one of those two output bits comprising the true value of the state bit if request x is in said first group, connecting the mask signal $M_{xy}$ to that one of those two output bits comprising the compliment value of the state bit if request x is in said second group, and connecting the mask signal $M_{yx}$ to the other of those two output bits not connected to the mask signal $M_{xy}$.

BRIEF DESCRIPTION OF THE DRAWINGS

The present invention will be described further, by way of example only, with reference to embodiments thereof as illustrated in the accompanying drawings, in which:

FIGS. 7A, 7B and 7C illustrate an alternative pattern of connections, associated priority orderings, and use of request groupings that can be used in an alternative embodiment in place of the pattern of connections, priority orderings and request grouping usage of FIGS. 3 to 5;

FIG. 11 illustrates the various priority orderings that can be encoded when using the pattern of connections of FIG. 10;

FIG. 12 illustrates the various request groupings that can be formed in order to establish the pattern of connections of FIG. 10 in accordance with one embodiment;

DESCRIPTION OF EMBODIMENTS

Figure 1:
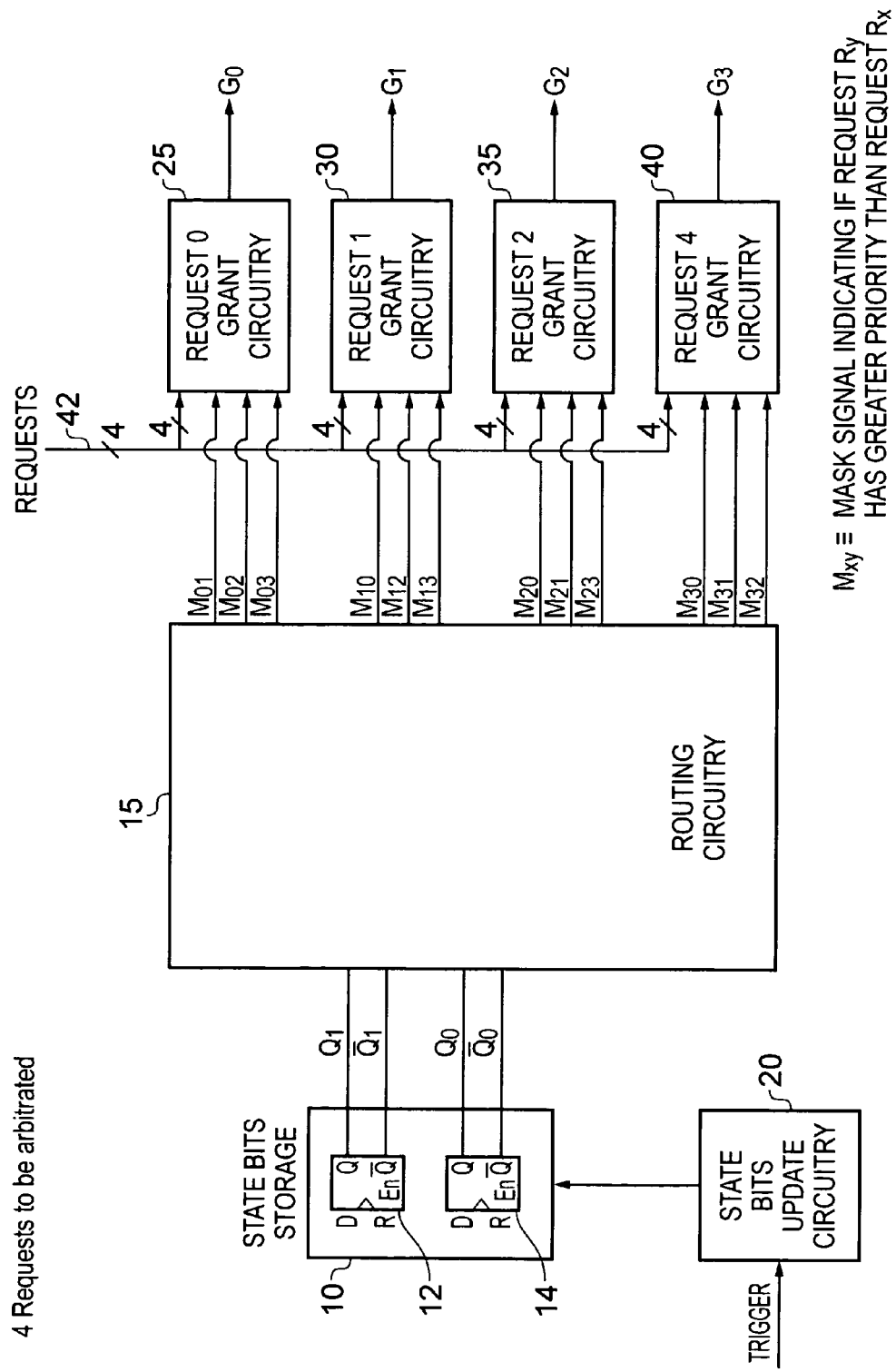
FIG. 1 is a block diagram of an arbitration circuit in accordance with one embodiment.

FIG. 1 is a block diagram of an arbitration circuit in accordance with one embodiment. State bits storage 10 comprises a plurality of state bit registers 12, 14 (in this embodiment each register being formed as a D-type flip-flop) for storing state bits. Each state bit register outputs both the true and compliment values of the state bit stored therein. Routing circuitry 15 receives the true and compliment values as output by the state bits storage 10, and provides a pattern of connections such that each mask signal in a set of mask signals output by the routing circuitry is directly connected to one of those output bits from the state bits storage. In the example of FIG. 1, it is assumed that there are four requests received over path 42, amongst which the arbitration circuitry must perform arbitration, and from the contents of the two state bits stored within the state bits storage 10, it will be seen that the routing circuitry produces twelve mask signals. The mask signal $M_{xy}$ indicates if request y has greater priority than request x, in one embodiment that mask signal being set to a logic one value if this is the case.

Separate request grant circuitry 25, 30, 35, 40 is provided for each of the requests in accordance with the embodiment illustrated in FIG. 1, and is arranged to produce a corresponding grant signal for that request, this grant signal being asserted if the grant circuitry determines that its associated request is asserted and has a higher priority than any other asserted request. Accordingly, it will be appreciated that only one of the grant circuits can assert a grant signal at any particular point in time.

Upon receipt of a trigger condition (such as acknowledgement of an asserted grant signal by the shared resource to which the requests are directed), the state bits update circuitry 20 alters the value of at least one of the state bits stored in the state bits storage 10, thereby altering the priority encoding represented by the pattern of connections.

Figure 2A:
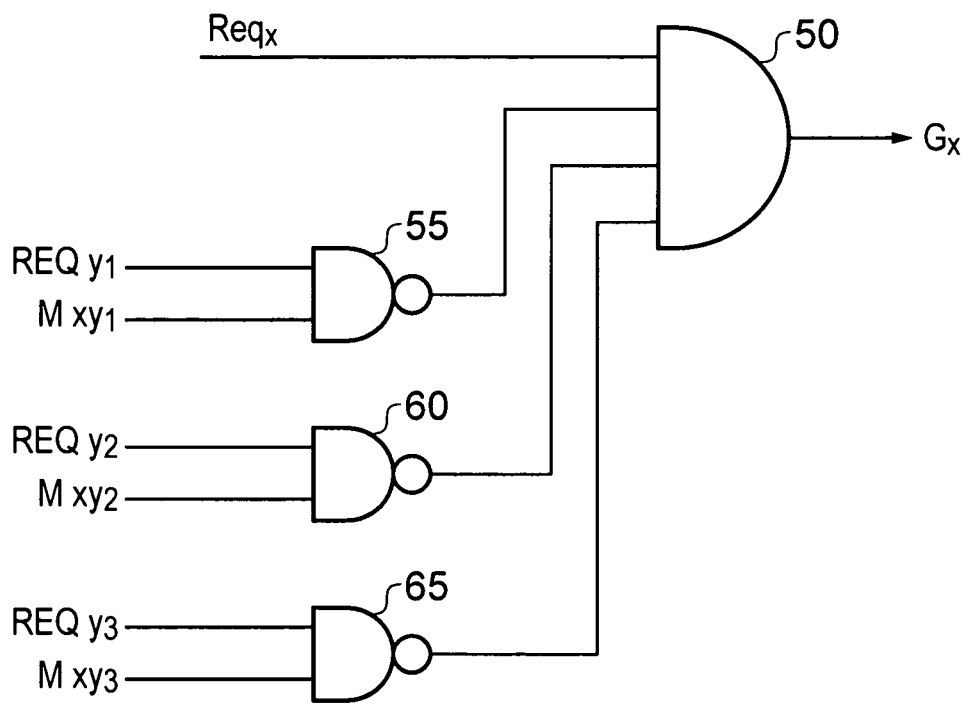
FIG. 2A is a diagram illustrating the construction of a request grant circuit in accordance with one embodiment.

FIG. 2A illustrates the components provided within each request grant circuit 25, 30, 35, 40 of FIG. 1 in accordance with one embodiment. In this diagram, the request associated with the request grant circuitry is request x and all of the other requests are identified as requests $y_1$, $y_2$ and $y_3$. Separate NAND gates 55, 60, 65 are provided in association with each of these other requests, and are arranged to receive one of those requests along with the associated mask signal. Hence, NAND gate 55 receiving request $y_1$ also receives the mask $M_{xy1}$ indicating whether the request $y_1$ has a greater priority than request x. It will be appreciated that the NAND gate 55 will hence always output a logic one value unless both the request $y_1$ is asserted and the corresponding mask signal indicates that request $y_1$ has a greater priority than request x. Only in that event will the output transition to a logic zero value. Accordingly, it will be seen that if request x is asserted and hence presents a logic one value to the first input of AND gate 50, a corresponding grant signal will be asserted for request x unless the output from any of the three NAND gates 55, 60, 65 is at a logic zero value (i.e. indicating that one of the other requests is asserted and has a higher priority).

Figure 2B:
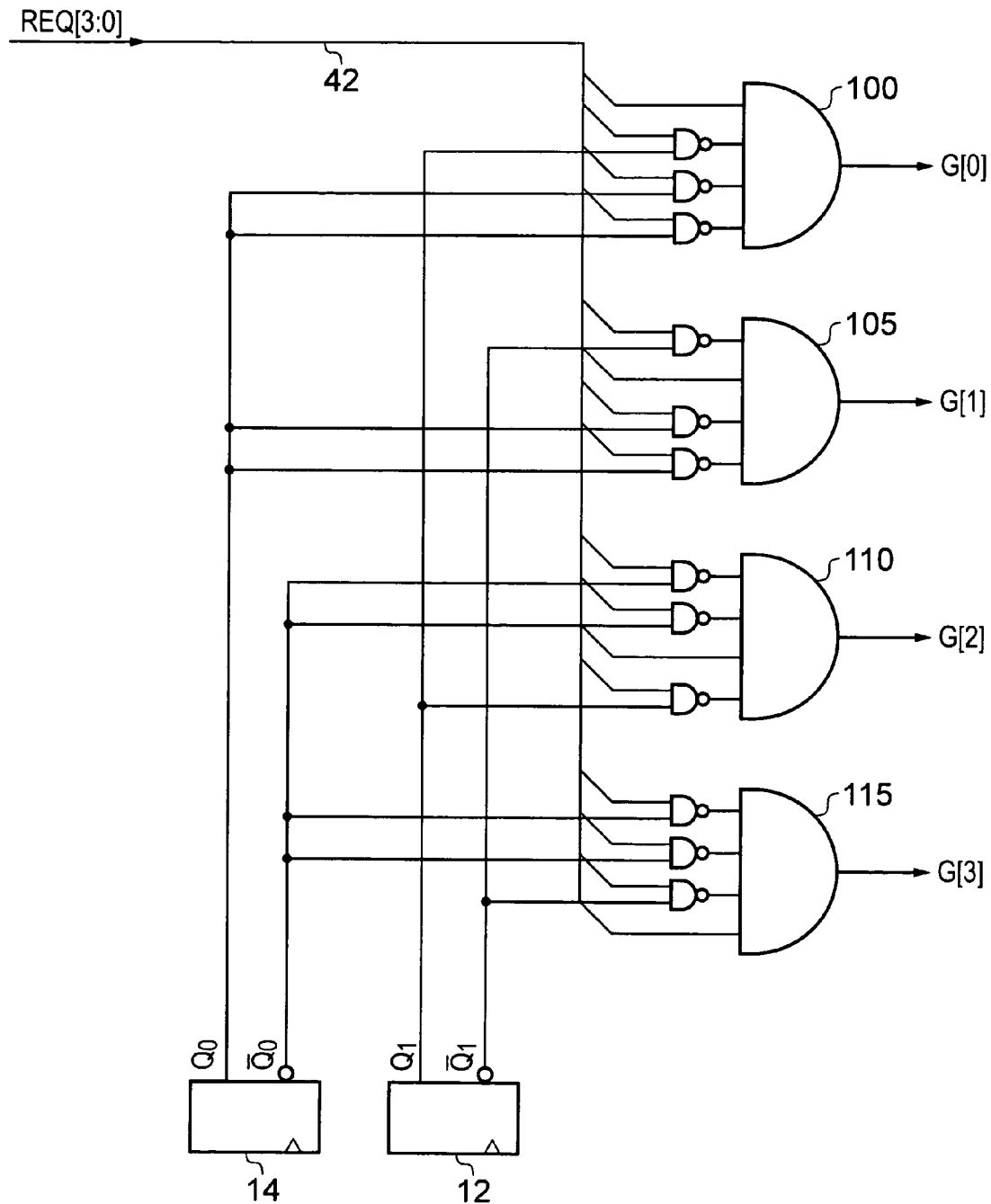
FIG. 2B illustrates in more detail the connections provided by the routing circuitry of FIG. 1 in order to connect the state bits to the various request grant circuits in accordance with one embodiment.

FIG. 2B illustrates the pattern of connections established between the two state bit registers 12, 14 within the state bits storage 10 and the components within each request grant circuit 25, 30, 35, 40, in accordance with one embodiment. The pattern of connections can be visualised by reference to the table of FIG. 3. In that table, the request x is provided along the horizontal axis and the request y is provided along the vertical axis. Each square hence identifies the value of the mask signal $M_{xy}$, and in particular which output from the state bit registers 12, 14 directly forms that mask signal. Purely by way of illustration, if we consider the request grant circuit 30, incorporating the associated AND gate 105 in FIG. 2B, it will be appreciated that the mask signals fed into the three NAND gates of that request grant circuit are the mask signals $M_{10}$, $M_{12}$ and $M_{13}$. From FIG. 3, it will be seen that $M_{10}$ is given by the compliment of the value stored in the state bit register 12, whilst the mask signals $M_{12}$ and $M_{13}$ are given by the true value stored within the state bit register 14. From a reference to FIG. 2B, it can be seen that the illustrated connections do indeed provide that direct relationship between the output from the state bits and the required mask signals.

Figures 3, 4:
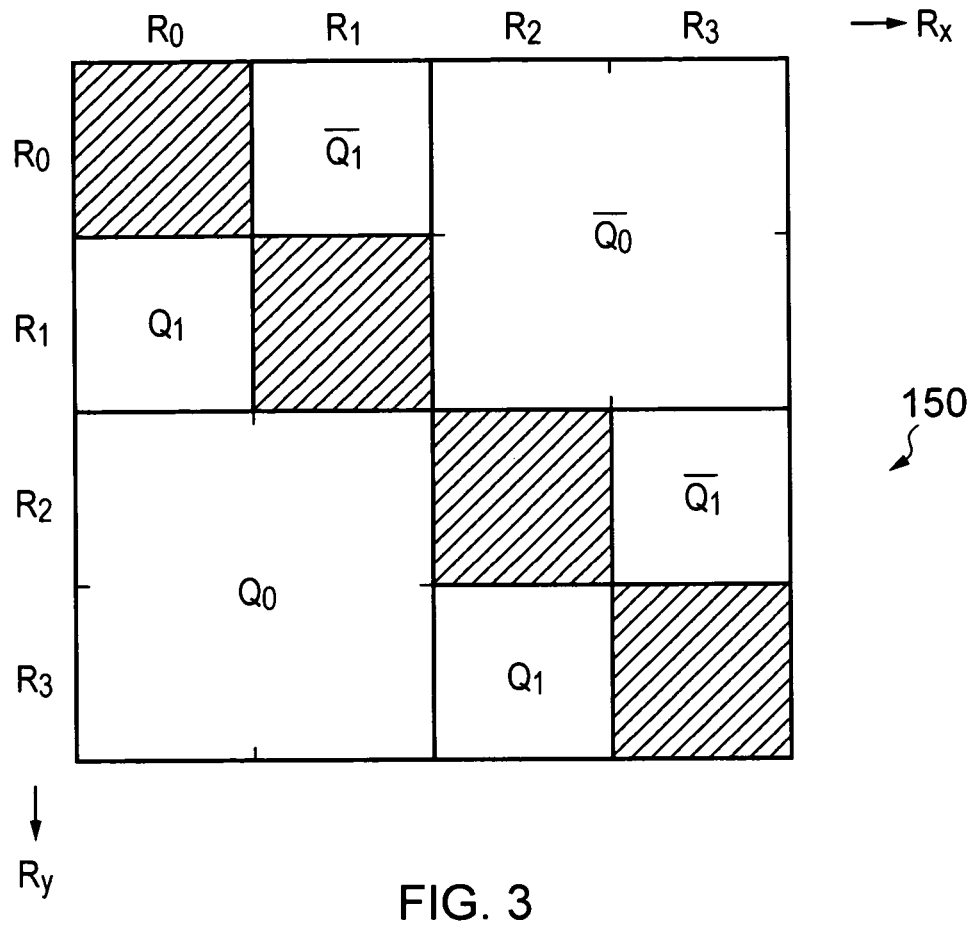
FIG. 3 illustrates the pattern of connections formed by the routing circuitry in the embodiment of FIG. 2B.
FIG. 4 identifies the priority orderings that are encoded when using the pattern of connections of FIG. 3 in accordance with one embodiment.

FIG. 4 illustrates the priority ordering between the various requests that is achieved dependent on the value of the state bits stored within the two state bit registers 12, 14. As will be appreciated from the table 160, by the time the values of the state bits have been cycled between each unique combination of values, each request will have been the highest priority request once. Hence, it will be appreciated that the illustrated connections provide a starvation-free arbitration mechanism.

Figure 5:
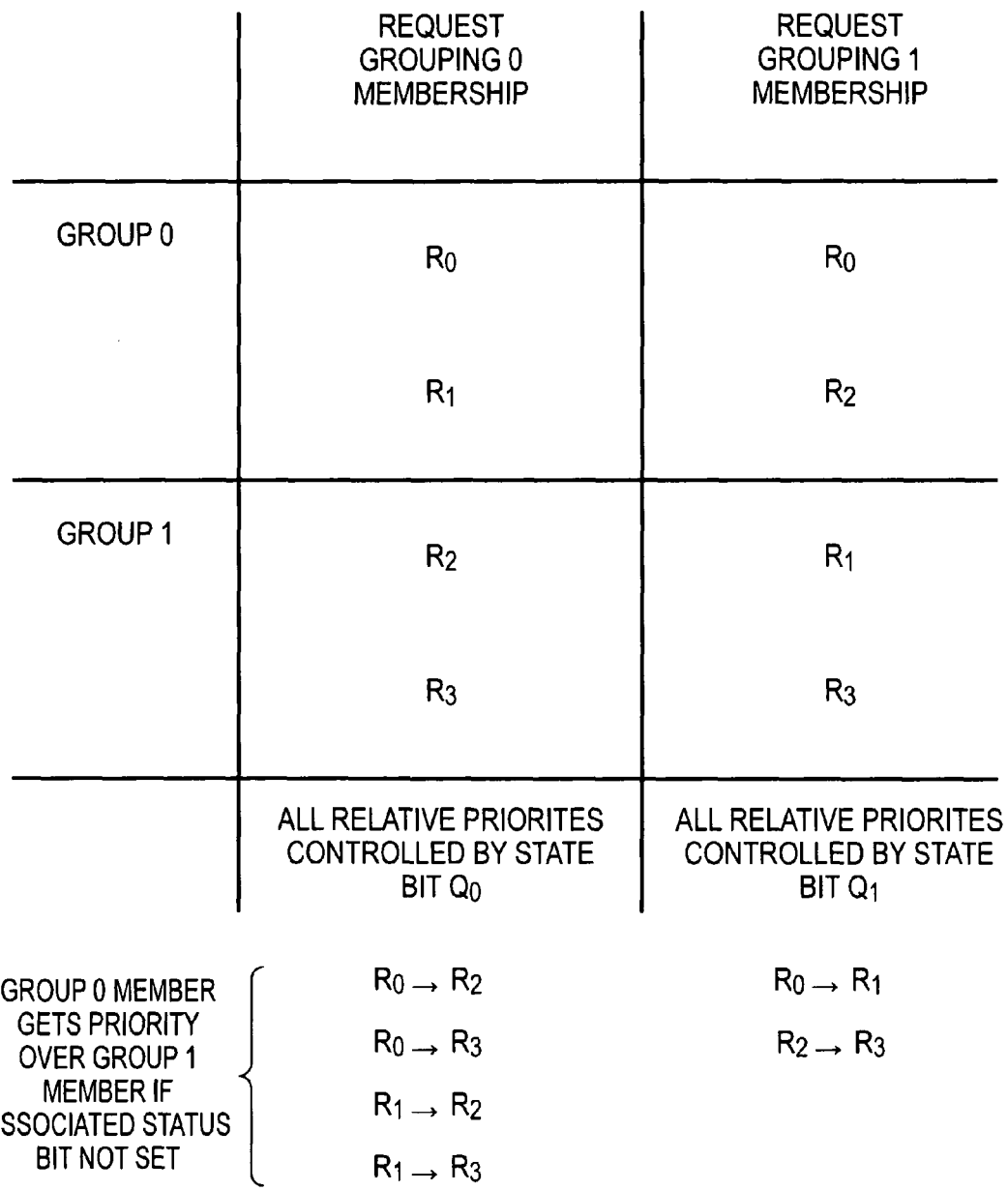
FIG. 5 illustrates the various request groupings used in one embodiment to establish the pattern of connections of FIG. 3.

FIG. 5 illustrates how request groupings can be formed in accordance with one embodiment in order to determine the connections to be made for each of the mask signals. In particular, in this embodiment, an associated request grouping is formed for each of the state bits. In this example, there are two state bits, and hence two request groupings. The first request grouping associated with the state bit $Q_0$ places requests 0 and 1 in group zero and requests 2 and 3 in group one. The second request grouping associated with state bit $Q_1$ places requests 0 and 2 in group zero and requests 1 and 3 in group one. By virtue of this arrangement, it can be seen that for every combination of request x and request y, where x is not equal to y, there is at least one request grouping where request x and request y are not in the same group. When determining the connections for the mask signals $M_{xy}$ and $M_{yx}$, a request grouping is chosen where request x and request y are not in the same group. Then, the mask signal $M_{xy}$ is connected to the true value of the associated state bit for the selected request grouping if request x is in group zero and is connected to the compliment value of the associated state bit if request x is in group one. The mask signal $M_{yx}$ is then connected to the other value of the associated state bit that the mask signal $M_{xy}$ has not been connected to.

It will be appreciated from a review of FIG. 5 that for some combinations of request x and request y, there is only one request grouping that can be used. For example the request grouping 0 has to be used when generating mask signals for combinations of requests 0 and 2. However, for some combinations, either request grouping could be used, for example either request grouping could be used when generating mask signals for a combination of requests 0 and 3. In one embodiment, the request groupings are used as shown in the lower half of FIG. 5. Hence, in this example, the request grouping 0 is used wherever possible, and the request grouping 1 is only used when necessary, i.e. to generate mask signals in respect of combinations of requests 0 and 1 or in respect of combinations of requests 2 and 3. It is this arrangement that gives rise to the pattern of connections 150 shown in FIG. 3.

Figures 7A, 7B:
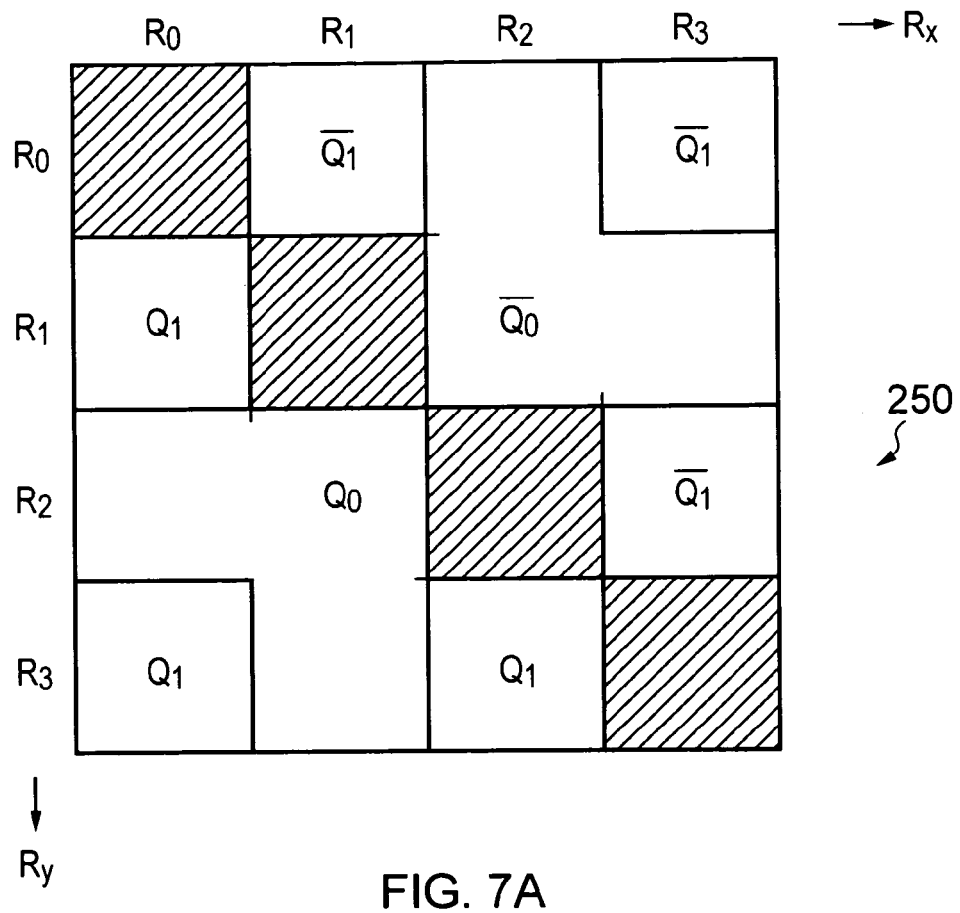

However, an alternative arrangement is illustrated with reference to FIGS. 7A to 7C. In particular, comparing FIG. 7C with FIG. 5, it will be seen that in this instance the request grouping 1 is additionally used for mask signals relating to combinations of requests 0 and 3, thereby evening out how the two request groupings are used. The resultant pattern of connections 250 is then illustrated in FIG. 7A, and gives rise to the altered priority ordering 260 of FIG. 7B. However, from a comparison of FIG. 7B with FIG. 4, it will be seen that the only change is that the ordering of requests 3 and 0 is swapped in instances where the value of state bits $Q_0$ and $Q_1$ are different. However, it is still the case that once all of the unique values of $Q_0$ and $Q_1$ have been cycled through, each request will have been the top priority request once, and accordingly this still provides a starvation-free arbiter.

It will hence be appreciated that the manner in which the pattern of connections are established allows a set of implementations of a weakly-fair arbiter to be achieved. In addition to altering the patterns in the way illustrated schematically by a comparison of FIGS. 3 and 7A, it should also be noted that the request inputs and state bits marked in these figures could be re-numbered in any arbitrary sequence whilst still providing starvation-free arbitration.

Furthermore, this is achieved using only a small number of state bits. In particular, the number of state bits I is equal to the result of the computation $\log_2 W$ if that result is an integer value, where W is the number of requests to be arbitrated amongst. Hence, in the example discussed thus far, where there are four requests, only two state bits are needed. Similarly, if the arbiter had to arbitrate between eight requests, only three state bits would be needed. If the result of the computation $\log_2 W$ is not an integer value, then the number of state bits is equal to the next integer larger than that result. Due to the small number of state bits required, and the connection pattern that achieves starvation-free arbitration by direct connection of each mask signal to one of the output bits from the state bit registers, this results in a smaller and faster starvation-free arbiter than was possible with previously known implementations.

Figure 6A:
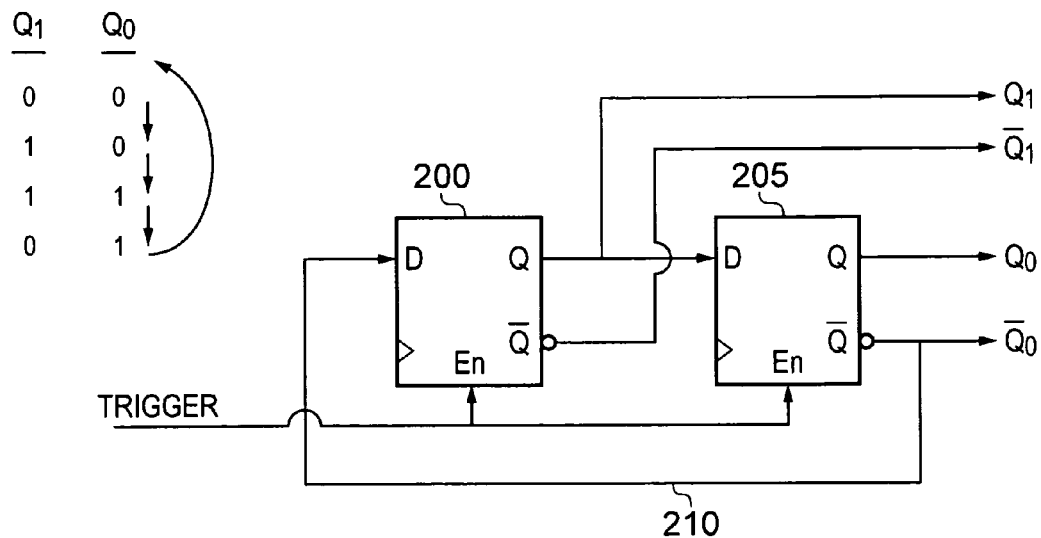
FIG. 6A illustrates an update mechanism for the state bits of FIG. 1 in accordance with one embodiment.

FIG. 6A illustrates one embodiment of state bit update circuitry 20 that can be used in association with the state bits storage. In this example, the state bit update circuitry merely involves feeding the compliment value output from the state register 205 back to the D input of the state register 200, along with the enable signal of both state registers 200, 205 being driven by a trigger signal. Accordingly, both state registers 200, 205 only update their values when a trigger condition sets the enable input of those state registers. It will be appreciated that there are many situations that can give rise to the trigger signal. For example, in one embodiment, the trigger signal may set every time an asserted grant signal generated by the arbiter is acknowledged by the shared resource, so that the priority ordering encoded by the mask signals changes each time a grant signal is used. The way in which the values within the two state registers 200, 205 change is illustrated schematically in FIG. 6A. As can be seen, this circuit simply steps through each unique combination of values, prior to returning back to the original value.

Figure 6B:
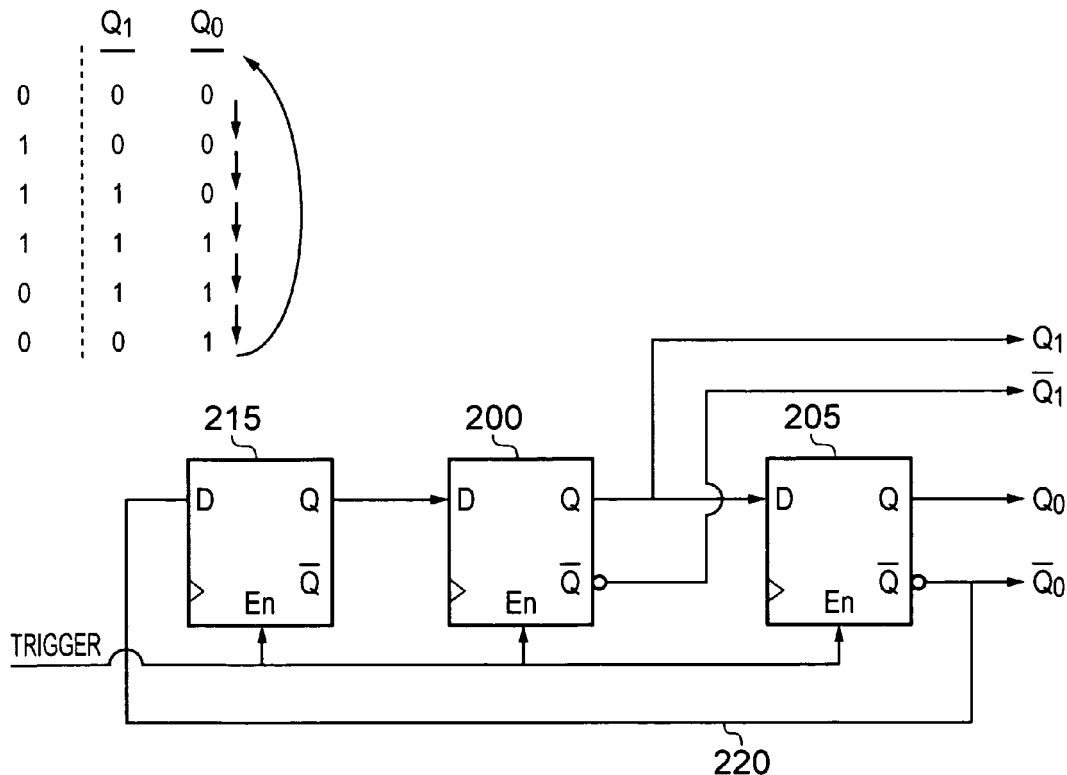
FIG. 6B illustrates an update mechanism for the state bits of FIG. 1 in accordance with an alternative embodiment.

FIG. 6B illustrates an alternative embodiment, where in addition to the two state bit registers 200, 205 within the state bits storage 10, an additional register 215 is maintained by the state bits update circuitry 20. Although the contents of the register 215 do not directly provide any output to the routing circuitry, that register does receive over path 220 the compliment value output from the state register 205 as its D input, and generates as its Q output a value that is fed to the D input of the state register 200. As can be seen from the sequence of transitions illustrated in FIG. 6B, this means that both the unique combination 00 and the unique combination 11 occur twice within a cycle, whilst the other unique combinations 10 and 01 appear once within that cycle. Such an approach allows a weighting to be applied to two of the requests relative to two of the other requests whilst still ensuring starvation-free arbitration.

It will be appreciated that FIG. 6B illustrates merely one example arrangement by which the state bits update circuitry 20 can apply some weighting to at least one of the requests, and it will be appreciated that there are many other forms of combinatorial logic that could be used to introduce such weightings to at least one of the requests.

In the instances where the result of the computation $\log_2 W$ is a non-integer value, and hence the number of state bits is set equal to the next integer larger than that result, it is also possible to introduce a weighting for at least one of the requests without having to arrange for any one unique combination of state bit values to appear more than once in a cycle. For example, returning to FIG. 6A, and assuming that there were three requests being arbitrated amongst, the circuitry of FIG. 6A could be retained as is, so that it cycles through four unique combinations, with the pattern of connections then providing a weighting for one of the requests.

Purely by way of example, if there were only 3 requests $R_0$, $R_1$, and $R_2$, the circuitry of FIGS. 1 and 2B could be used, but with the request grant circuitry 40 omitted (since there is no request $R_3$ in this instance). If the state update circuitry of FIG. 6A were also used, then request $R_2$ would be given priority for two of the possible unique values of the state bits, whereas requests $R_0$ and $R_1$ would each be given highest priority for one unique value of the state bits. Accordingly, $R_2$ would receive a proportionately higher weighting. The sequence of priorities would be as in FIG. 4 but with $R_3$ omitted, and hence $R_2$ would have the highest priority when the state bits are "10" or "11".

It will be appreciated that FIGS. 6A and 6B illustrate merely one way in which the state bits may be updated in order to cycle through at least W unique combinations of values. Whilst a simple "Johnson" counter such as illustrated in FIG. 6A can be used, it will be appreciated that other mechanisms are possible. For example, when W is not a power of 2, a Linear Feedback Shift Register (LFSR) mechanism may be preferable, since such a mechanism is likely to be quicker and use fewer gates in such a situation than if an ordinary binary counter were used (an ordinary binary counter being another possibility if W is not a power of 2). Alternatively, an unrelated counter that independently cycles through at least W states could be used (or re-used) to create a random arbitration policy. Hence, state storage and state update circuitry from elsewhere in the circuit's design can be re-used if it meets the necessary criteria of cycling through at least W unique states in a way that is independent of the sequence of grants from the arbiter. For example, multiple instances of the arbiter could share the same state storage and state update circuitry, thereby further saving power and area within the design.

Figure 8:
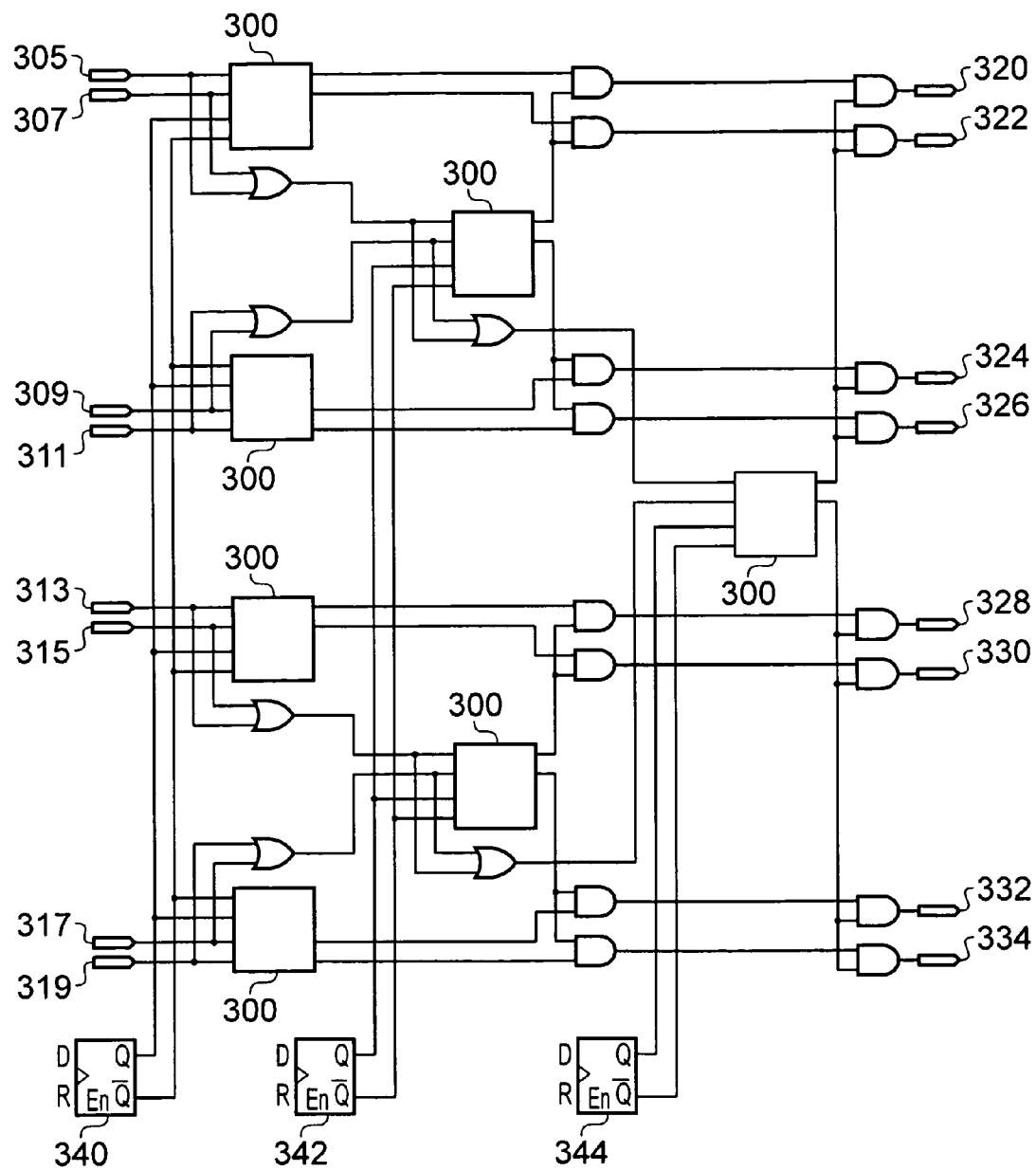
FIG. 8 illustrates how an arbitration circuitry in accordance with one embodiment may be formed as a tree structure.

FIG. 8 illustrates arbitration circuitry in accordance with an alternative embodiment, in this particular example the arbitration circuitry being arranged to arbitrate between eight requests. Whilst the circuitry of FIG. 1 could be adapted to handle arbitration of eight requests, through the provision of three state bit registers within the state bits storage 10 and eight request grant circuits, in the embodiment shown in FIG. 8 the arbitration is constructed to have a tree form, comprising multiple instances of a circuit block 300 interconnected to form a tree structure used to collectively implement the routing circuitry and the grant circuitry. As can be seen from FIG. 8, in this example the tree structure has three stages, the first stage using four instances of the circuit block 300, the second stage using two instances of the circuit block 300, and the final stage including a single instance of the circuit block 300. In the example shown in FIG. 8, every circuit block 300 within a particular stage is connected to the same output bits from the state bits storage. Hence, the state bit register 340 provides the output bits required by the circuit block 300 in the first stage, the state bit register 342 provides the output bits required by the circuit blocks in the second stage, and the state bit register 344 provides the output bits required by the circuit block 300 in the final stage. The eight requests are provided at the inputs 305, 307, 309, 311, 313, 315, 317 and 319. The signals are routed between the various blocks 300 via the signal wires and logic gates shown in FIG. 8, and the eight grant signals appear at the output pins 320, 322, 324, 326, 328, 330, 332 and 334.

Figure 9:
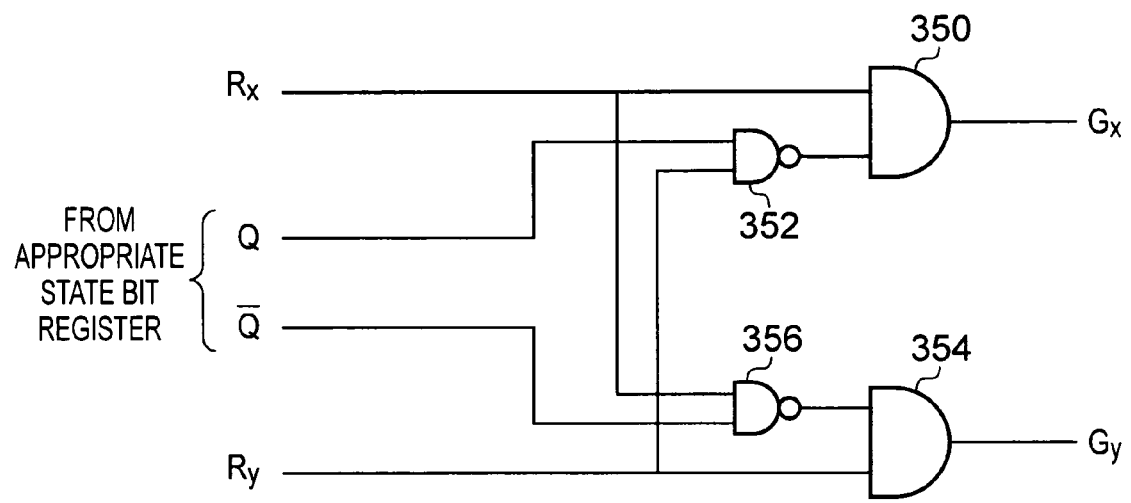
FIG. 9 schematically illustrates components provided within each circuit block 300 of FIG. 8 in accordance with one embodiment.

Each of the circuit blocks can take the form illustrated in FIG. 9, FIG. 9 showing the general case for two requests x and y, and for true and compliment values of a state bit provided from the appropriate state bit register 340, 342 or 344. Hence, the NAND gate 352 receives the true value from the appropriate state bit register along with request y, whilst the NAND gate 356 receives the compliment value from the appropriate state bit register along with the request x. The AND gate 350 will assert the grant signal for request x if request x is asserted, and a logic one value is output by the NAND gate 352. Conversely, the AND gate 354 will assert the grant signal for request y if request y is asserted and a logic one value is output from the NAND gate 356.

Figure 10:
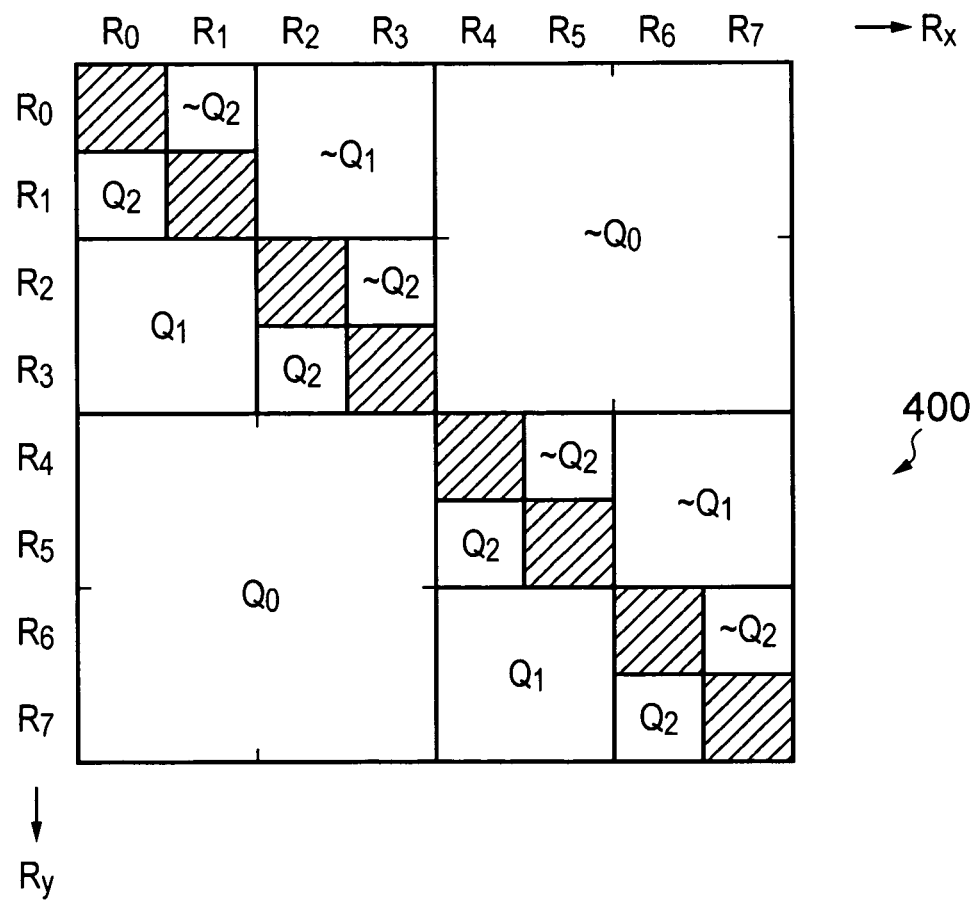
FIG. 10 illustrates a pattern of connections established by the circuitry of FIG. 8 in accordance with one embodiment.

FIG. 10 provides a table 400 illustrating the pattern of connections that are established within the arbitration circuit of FIG. 8 using the three state bits $Q_0$, $Q_1$ and $Q_2$. As with the earlier discussion of FIG. 3, the request inputs and state bits in the figure can be re-numbered in any arbitrary sequence.

FIG. 11 provides a table 410 showing the relative priorities that result from using the connection pattern 400 of FIG. 10 within the arbitration circuitry. It will be noted that whilst this arbiter does not give a round-robin sequence of request priorities, it does ensure that each request has priority over all others at least once during a full cycle of the state, thus guaranteeing freedom from starvation for any request.

FIG. 12 illustrates an example of the request groupings that can be formed for each state bit in accordance with one embodiment. From a review of these groupings, it will be seen that for any combination of request x and request y, where x is not equal to y, there is at least one request grouping where request x and request y are not in the same group. In the lower half of FIG. 12, the various mask signals that can be created directly from the state bit associated with the corresponding priority grouping in accordance with one embodiment are illustrated. In this example, the request grouping 0 is used wherever possible, then the request grouping 1 is used wherever possible for any mask signals not already generated using the request grouping 0. Finally, the request grouping 2 is used for any remaining mask signals not already generated using the request grouping 0 or the request grouping 1. However, in an alternative embodiment, similar to the approach illustrated in FIG. 7C, the way in which the various request groupings are used can be managed so as to attempt to even out the use of the various state bits. Such an approach may enable a reduction in the fan-out from any particular state bit register output.

Figure 13:
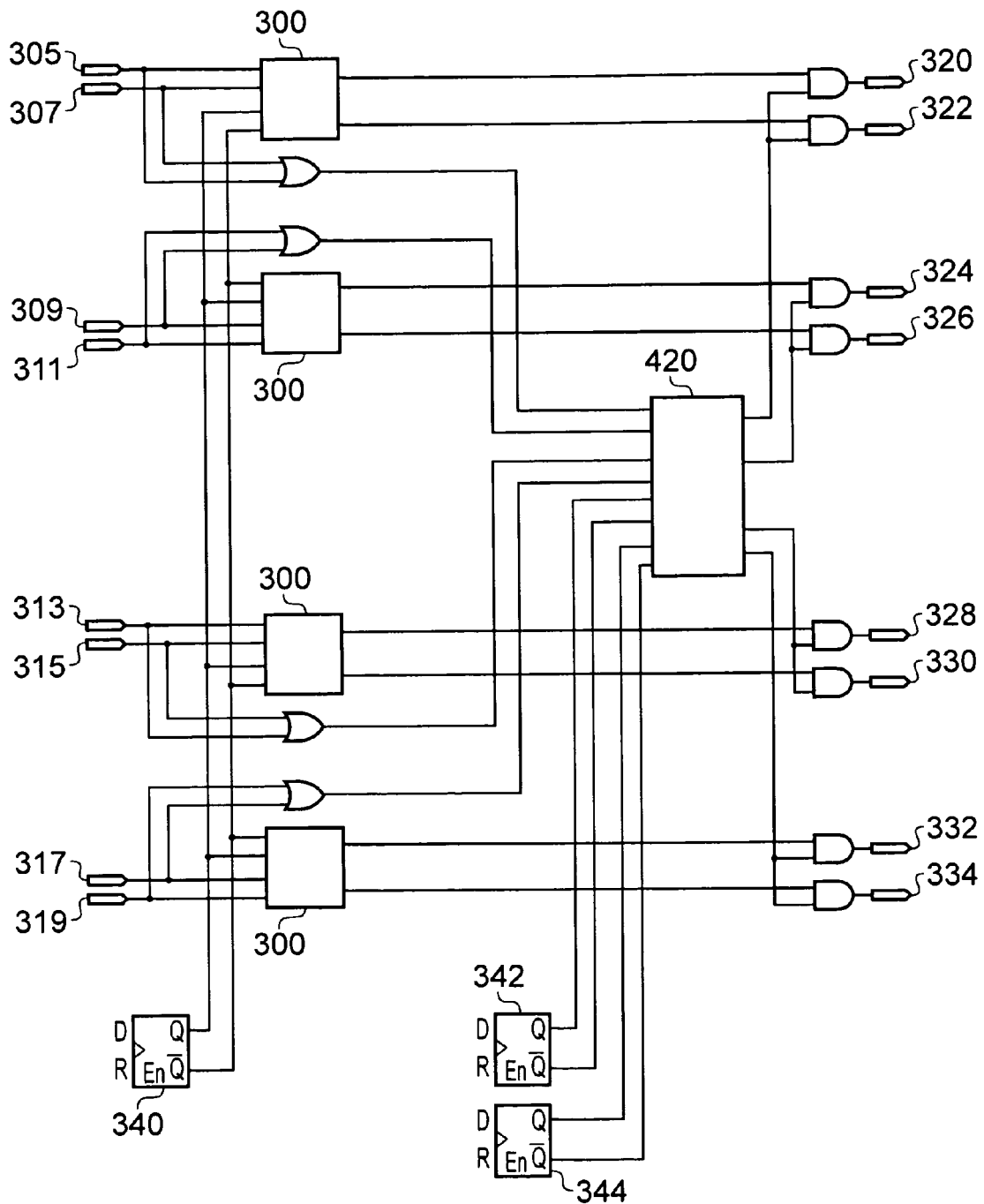
FIG. 13 illustrates an alternative tree structure that can be used in place of the tree structure of FIG. 8 in accordance with one embodiment.

The arrangement illustrated in FIG. 8 is a radix-2 example of a tree structure, with each circuit block 300 receiving two inputs and two state bits. However, trees of other radices can be similarly constructed. FIG. 13 illustrates an example that uses a radix-4 structure, in particular the circuit block 420 receiving four requests and four state bit outputs. Assuming for consistency with FIG. 8 there are only eight requests, then in the illustrated embodiment the first stage remains identical to the first stage of the configuration of FIG. 8, with each circuit block 300 only receiving two inputs. Alternatively, the circuit could be arranged to have two radix-4 arbiters in the first stage and one radix-2 arbiter in the second stage. Furthermore, it will be appreciated that if instead 16 requests were being arbitrated amongst, then each circuit block could be arranged to receive four request inputs and four state bit outputs.

As will be appreciated from the approach of either FIG. 8 or FIG. 13, when the arbitration circuitry is formed in this manner, the circuit pre-arbitrates between groups of requests at each stage and then arbitrates between those groups at the next stage (if the group has at least one active request). Such a structure trades off significantly reduced area and fan-out from the request inputs against a longer logic path from the request inputs to the grant outputs. However, for a larger number of requests, such a tree structure form of circuit is likely to be preferable.

Figure 14:
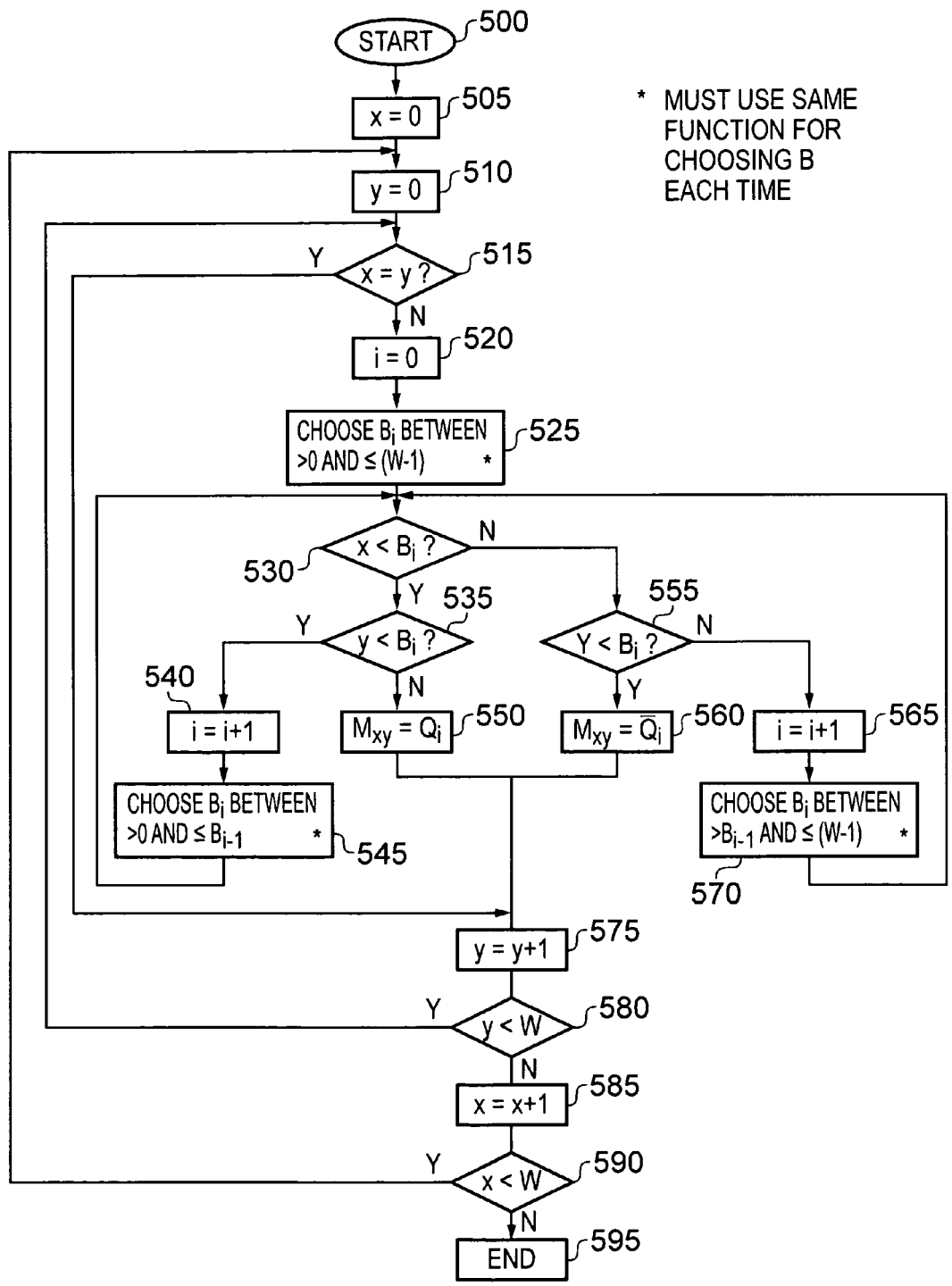
FIG. 14 is a flow diagram illustrating how the pattern of connections for the routing circuitry are formed in accordance with one embodiment.

FIG. 14 is a flow diagram illustrating how the connections of the routing circuitry can be formed in accordance with one embodiment. The process starts at step 500, whereafter at step 505 a parameter x is set equal to zero, and then at step 510 a parameter y is set equal to zero. At step 515, it is determined whether the parameter x is equal to the parameter y, and if so the process branches directly to step 575 where the parameter y is incremented. Then, at step 580 it is determined whether the parameter y is less than W, i.e. less that the total number of requests being arbitrated, and if so the process returns to step 515 where it will now be determined that x does not equal y.

Accordingly the process then proceeds to step 520 where a parameter i is set equal to zero. Thereafter, at step 525 a parameter $B_1$ is selected to be a value that is greater than zero and less than or equal to W−1. This step is performed to determine the size of each of the two groups into which the requests are going to be split for the request grouping currently being considered. Accordingly, by way of example, in one embodiment the function that chooses the value of $B_1$ may be set so as to choose as $B_1$ a value that will partition the requests into two equally sized groups.

Thereafter, the process proceeds to step 530, where it is determined whether the parameter x is less than $B_1$. If it is, then this indicates that request x is in the first group. It is then checked at step 535 whether the parameter y is less than $B_1$. If it is not, then this indicates that the requests x and y are in different groups when considering the request grouping i, and accordingly the process proceeds to step 550 where the mask $M_{xy}$ is generated by a direct connection to the state bit $Q_i$.

Similarly, if at step 530 it is determined that x is not less than $B_i$, and at step 555 it is determined that y is less than $B_1$ then the process proceeds to step 560 where the mask value $M_{xy}$ is generated by a direct connection to the compliment of the state bit $Q_i$.

If at step 535 it is determined that y is less than $B_i$, then this indicates that both x and y are in the same group when considering the request grouping i, and accordingly that request grouping cannot be used for the particular combination of requests x and y. Hence, the process proceeds to step 540 where i is incremented, and then at step 545 the parameter $B_1$ is calculated for the new value of i. The same function must be used for choosing B each time within the process of FIG. 14, but in this instance the range of values extends from greater than zero to less than or equal to $B_{i-1}$. Hence, at this stage, it can be seen that the original first group is sub-divided down into two further groups in the hope that this will cause request x and request y to then reside within different sub-groups. The process then returns to step 530. At some point during iterations of the steps 530, 535, 540, 545, it will be appreciated that x and y will end up in different sub-groups, and at this stage the process will then proceed to step 550 or step 560 where the mask signal will be generated by a direct connection to the true or compliment value of the appropriate state bit (i.e. the state bit associated with the current value of i).

Similarly, if it is determined at step 555 that y is not less than $B_i$, this again means that the request x and y are in the same group, and accordingly at step 565 the value of i is incremented, and then at step 570 a new value of $B_1$ is chosen. Again, the same function is used for choosing B, but in this instance the range of values extends from greater than $B_{i-1}$ up to less than or equal to W−1. Hence in this case, the original second group is sub-divided into two groups. Again after one or more iterations of steps 530, 555, 565 and 570 it will be appreciated that the requests x and y will end up within different sub-groups, and accordingly at step 550 or step 560 the mask signal will be generated by a direct connection to the true or compliment value of the appropriate state bit.

Each time y is incremented at step 575, then provided y continues to be less than W, the process returns to step 515. However, once it is determined at step 580 that all values of y have been considered then at step 585 the value of x is incremented by 1 and, provided that x is determined to be less than W at step 590, the process returns to step 510. When it is determined at step 590 that x is no longer less than W, then the process ends at step 595, since at this point all of the required mask values will have been directly connected to the true or compliment values of one state bit.

The approach discussed in FIG. 14, where a group is sub-divided into two further groups whenever the requests x and y are found to be within the same group, is logically equivalent to the process of forming, for each of the I state bits, an associated request grouping where the plurality of requests are split into a first group and a second group, such that for every combination of request x and request y, where x is not equal to y, there is at least one request grouping where request x and request y are not in the same group. In summary, when using the approach of FIG. 14, an iteration variable i is initialised to zero and the groups of requests R are sub-divided into two groups. If a request x is in the first group and a request y is in the second group, then the mask signal $M_{xy}$ is derived from the true value of the state bit $Q_i$. Conversely, if the request x is in the second group and the request y is in the first group, then the mask signal $M_{xy}$ is derived from the compliment value of the state bit $Q_i$. If both requests x and y are in the same group, then the iteration variable i is incremented by one, and that group is divided into two sub-groups, with the process then being repeated until all of the mask signals $M_{xy}$ for all x and y have been assigned.

It will be appreciated that the arbitration circuitry of the described embodiments can be used in a variety of situations to perform a fair arbitration function. Such a fair arbiter can also be used as a tie-break in a priority arbitration decision.

The technique of the described embodiments provides a set of implementations of an oblivious, iterative-priority, work-conserving, weakly-fair arbiter.

The above described techniques allow an arbiter or allocator to be designed that has freedom to implement a minimum-delay path from request to grant with low fan-out and a small number of state bits, by not restricting the implementation to have round-robin, least-recently-granted, or any other known arbitration scheme.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. Arbitration circuitry for arbitrating between a plurality W of requests R for access to a shared resource, comprising:
   state bits storage configured to store I state bits Q and to generate 2I output bits comprising the true and compliment values of each stored state bit;
   routing circuitry configured to generate a set of mask signals M from the output bits, the set of mask signals encoding a priority ordering amongst the plurality of requests, with the mask signal $M_{xy}$ encoding whether the request $R_y$ has greater priority than the request $R_x$;
   grant circuitry configured to receive the set of mask signals and the plurality of requests, and to grant access to the shared resource to an asserted request from said plurality of requests that, having regard to the priority ordering encoded by the set of mask signals, has a higher priority than any other asserted request amongst said plurality of requests;
   state bit update circuitry configured in response to a trigger condition to perform an update operation to alter the value of at least one of the stored state bits thereby causing a change in the priority ordering encoded by the set of mask signals;
   the routing circuitry providing a pattern of connections such that each mask signal in the set is directly connected to one of said output bits;
   the pattern of connections being determined by a process at least equivalent to:

(i) for each of the I state bits, forming an associated request grouping where the plurality of requests are split into a first group and a second group, such that for every combination of request x and request y, where x is not equal to y, there is at least one request grouping where request x and request y are not in the same group; and (ii) when determining the connections for the mask signals $M_{xy}$ and $M_{yx}$, selecting one of the at least one request grouping where request x and request y are not in the same group, identifying the two output bits comprising the true and compliment values of the state bit associated with that selected request grouping, connecting the mask signal $M_{xy}$ to that one of those two output bits comprising the true value of the state bit if request x is in said first group, connecting the mask signal $M_{xy}$ to that one of those two output bits comprising the compliment value of the state bit if request x is in said second group, and connecting the mask signal $M_{yx}$ to the other of those two output bits not connected to the mask signal $M_{xy}$.

2. Arbitration circuitry as claimed in claim 1, wherein the number of state bits I is equal to a result of the computation $\log_2 W$ if said result is an integer.

3. Arbitration circuitry as claimed in claim 2, wherein the number of state bits I is equal to the next integer larger than said result if said result is a non-integer.

4. Arbitration circuitry as claimed in claim 1, wherein during the performance of a sequence of update operations the state bit update circuitry is configured to employ a cycle of at least W unique combinations of values of said state bits, such that by the time said cycle has been completed, each request will at least once have been the highest priority request according to the associated priority ordering.

5. Arbitration circuitry as claimed in claim 4, wherein each unique combination of values of said state bits appears only once in said cycle.

6. Arbitration circuitry as claimed in claim 4, wherein at least one unique combination of values of said state bits appears more than once in said cycle in order to introduce a weighting in respect of at least one of said plurality of requests.

7. Arbitration circuitry as claimed in claim 4, wherein if the number of state bits I is greater than a result of the computation $\log_2 W$, each unique combination of values of said state bits is employed in said cycle in order to introduce a weighting in respect of at least one of said plurality of requests.

8. Arbitration circuitry as claimed in claim 4 wherein the cycle used by the state bit update circuitry is programmable.

9. Arbitration circuitry as claimed in claim 1, wherein the first group and the second group of each request grouping have an equal number of the requests when W is an even number, and a difference of one request when W is an odd number.

10. Arbitration circuitry as claimed in claim 1, wherein the grant circuitry comprises a grant generation block associated with each request signal, each grant generation block having a NAND function block configured to perform a logical NAND of each non-associated request with the relevant mask signal for that non-associated request in order to produce a sequence of NAND output signals, and a grant assertion block configured to assert a grant signal for the associated request if the associated request is asserted and none of the NAND output signals are set.

11. Arbitration circuitry as claimed in claim 1, comprising multiple instances of a circuit block interconnected to form a tree structure used to collectively implement the routing circuitry and the grant circuitry, the tree structure having multiple stages, each stage employing at least one instance of the circuit block, and each circuit block being used to arbitrate between multiple of said requests.

12. Arbitration circuitry as claimed in claim 11, wherein said tree structure is a radix-2 tree structure and each circuit block is used to arbitrate between two of said requests.

13. Arbitration circuitry as claimed in claim 11, wherein said tree structure is a radix-4 tree structure and at least one of said circuit blocks is used to arbitrate between four of said requests.

14. Arbitration circuitry as claimed in claim 11, wherein for each stage, every circuit block within that stage is connected to the same output bits from the state bits storage.

15. Arbitration circuitry as claimed in claim 1, wherein the arbitration circuitry is incorporated within a data processing apparatus, and said state bits storage and state bit update circuitry is shared with one or more other components of the data processing apparatus.

16. A method of arbitrating between a plurality W of requests R for access to a shared resource, comprising:

storing I state bits Q and generating 2I output bits comprising the true and compliment values of each stored state bit;

employing routing circuitry to generate a set of mask signals M from the output bits, the set of mask signals encoding a priority ordering amongst the plurality of requests, with the mask signal $M_{xy}$ encoding whether the request $R_y$ has greater priority than the request $R_x$;

based on the set of mask signals and the plurality of requests, granting access to the shared resource to an asserted request from said plurality of requests that, having regard to the priority ordering encoded by the set of mask signals, has a higher priority than any other asserted request amongst said plurality of requests;

in response to a trigger condition, performing an update operation to alter the value of at least one of the stored state bits thereby causing a change in the priority ordering encoded by the set of mask signals; and arranging the routing circuitry to provide a pattern of connections such that each mask signal in the set is directly connected to one of said output bits, and determining the pattern of connections by a process at least equivalent to:

(i) for each of the I state bits, forming an associated request grouping where the plurality of requests are split into a first group and a second group, such that for every combination of request x and request y, where x is not equal to y, there is at least one request grouping where request x and request y are not in the same group; and (ii) when determining the connections for the mask signals $M_{xy}$ and $M_{yx}$, selecting one of the at least one request grouping where request x and request y are not in the same group, identifying the two output bits comprising the true and compliment values of the state bit associated with that selected request grouping, connecting the mask signal $M_{xy}$ to that one of those two output bits comprising the true value of the state bit if request x is in said first group, connecting the mask signal $M_{xy}$ to that one of those two output bits comprising the compliment value of the state bit if request x is in said second group, and connecting the mask signal $M_{yx}$ to the other of those two output bits not connected to the mask signal $M_{xy}$.

17. A method of generating routing circuitry for arbitration circuitry used to arbitrate between a plurality W of requests R for access to a shared resource, the arbitration circuitry having state bits storage for storing I state bits Q and for generating 2I output bits comprising the true and compliment values of each stored state bit, the routing circuitry for generating a set of mask signals M from the output bits, the set of mask signals encoding a priority ordering amongst the plurality of requests, with the mask signal $M_{xy}$ encoding whether the request $R_y$ has greater priority than the request $R_x$, grant circuitry for receiving the set of mask signals and the plurality of requests, and for granting access to the shared resource to an asserted request from said plurality of requests that, having regard to the priority ordering encoded by the set of mask signals, has a higher priority than any other asserted request amongst said plurality of requests, and state bit update circuitry configured in response to a trigger condition to perform an update operation to alter the value of at least one of the stored state bits thereby causing a change in the priority ordering encoded by the set of mask signals, the method comprising:

providing within the routing circuitry a pattern of connections such that each mask signal in the set is directly connected to one of said output bits;

determining the pattern of connections by a process at least equivalent to:

(i) for each of the I state bits, forming an associated request grouping where the plurality of requests are split into a first group and a second group, such that for every combination of request x and request y, where x is not equal to y, there is at least one request grouping where request x and request y are not in the same group; and (ii) when determining the connections for the mask signals $M_{xy}$ and $M_{yx}$, selecting one of the at least one request grouping where request x and request y are not in the same group, identifying the two output bits comprising the true and compliment values of the state bit associated with that selected request grouping, connecting the mask signal $M_{xy}$ to that one of those two output bits comprising the true value of the state bit if request x is in said first group, connecting the mask signal $M_{xy}$ to that one of those two output bits comprising the compliment value of the state bit if request x is in said second group, and connecting the mask signal $M_{yx}$ to the other of those two output bits not connected to the mask signal $M_{xy}$.

18. Arbitration circuitry for arbitrating between a plurality W of requests R for access to a shared resource, comprising:

state bits storage means for storing I state bits Q and for generating 2I output bits comprising the true and compliment values of each stored state bit;

routing means for generating a set of mask signals M from the output bits, the set of mask signals encoding a priority ordering amongst the plurality of requests, with the mask signal $M_{xy}$ encoding whether the request $R_y$ has greater priority than the request $R_x$;

grant means for receiving the set of mask signals and the plurality of requests, and for granting access to the shared resource to an asserted request from said plurality of requests that, having regard to the priority ordering encoded by the set of mask signals, has a higher priority than any other asserted request amongst said plurality of requests;

state bit update means for performing an update operation in response to a trigger condition in order to alter the value of at least one of the stored state bits thereby causing a change in the priority ordering encoded by the set of mask signals;

the routing means for providing a pattern of connections such that each mask signal in the set is directly connected to one of said output bits;

the pattern of connections being determined by a process at least equivalent to:

(i) for each of the I state bits, forming an associated request grouping where the plurality of requests are split into a first group and a second group, such that for every combination of request x and request y, where x is not equal to y, there is at least one request grouping where request x and request y are not in the same group; and (ii) when determining the connections for the mask signals $M_{xy}$ and $M_{yx}$, selecting one of the at least one request grouping where request x and request y are not in the same group, identifying the two output bits comprising the true and compliment values of the state bit associated with that selected request grouping, connecting the mask signal $M_{xy}$ to that one of those two output bits comprising the true value of the state bit if request x is in said first group, connecting the mask signal $M_{xy}$ to that one of those two output bits comprising the compliment value of the state bit if request x is in said second group, and connecting the mask signal $M_{yx}$ to the other of those two output bits not connected to the mask signal $M_{xy}$.

\* \* \* \* \*